July 30, 1963 A. E. BUCHHOLZ ETAL 3,099,023
WRAP SPRING ADJUSTMENT LOCK FOR BOAT WINDSHIELD
Filed Dec. 19, 1960 2 Sheets-Sheet 1
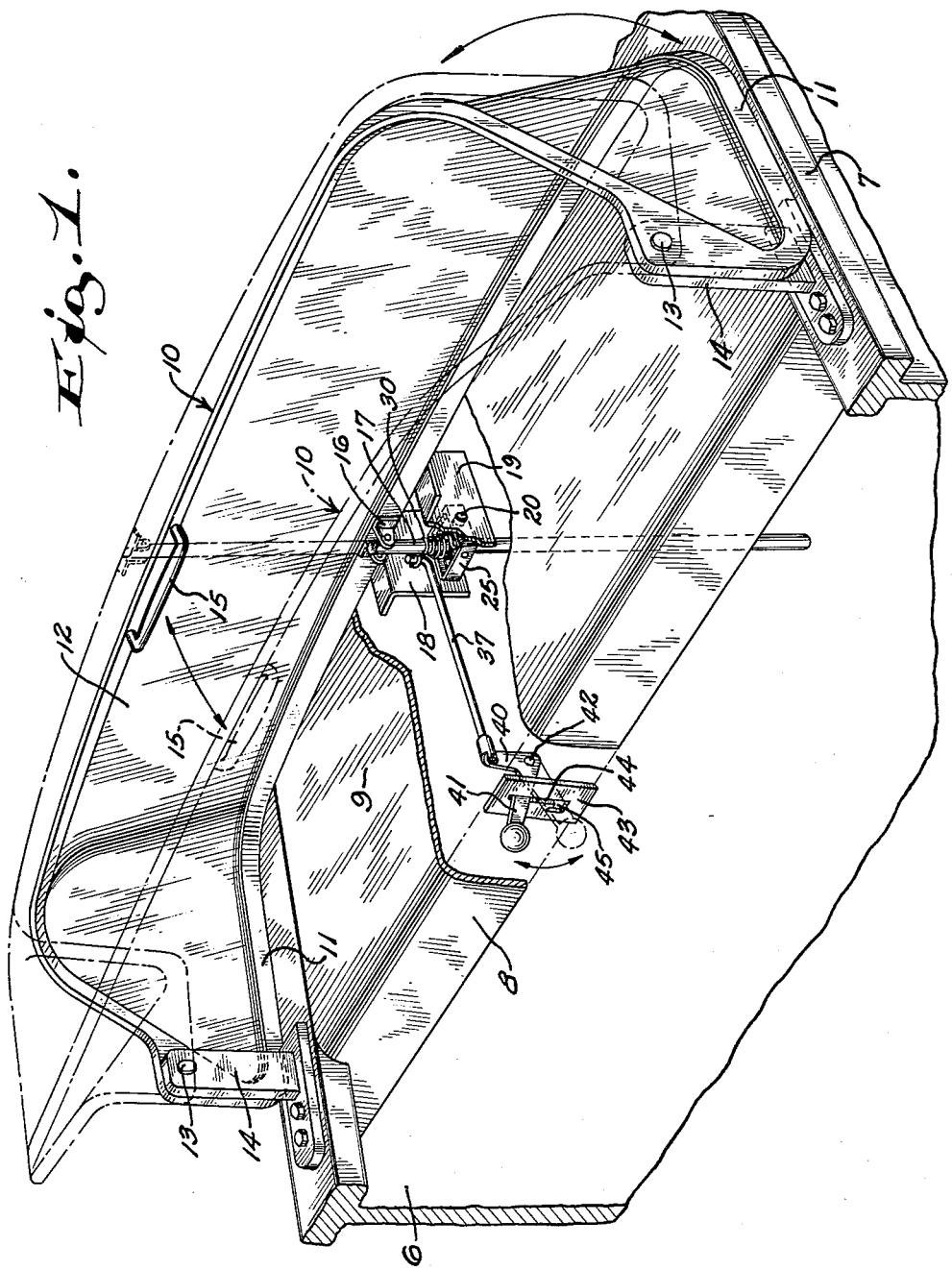
INVENTORS.
ALBERT E. BUCHHOLZ
RALPH R. HECK
BY
Wheeler, Wheeler & Wheeler
ATTORNEYS.

July 30, 1963   A. E. BUCHHOLZ ETAL   3,099,023
WRAP SPRING ADJUSTMENT LOCK FOR BOAT WINDSHIELD
Filed Dec. 19, 1960   2 Sheets-Sheet 2
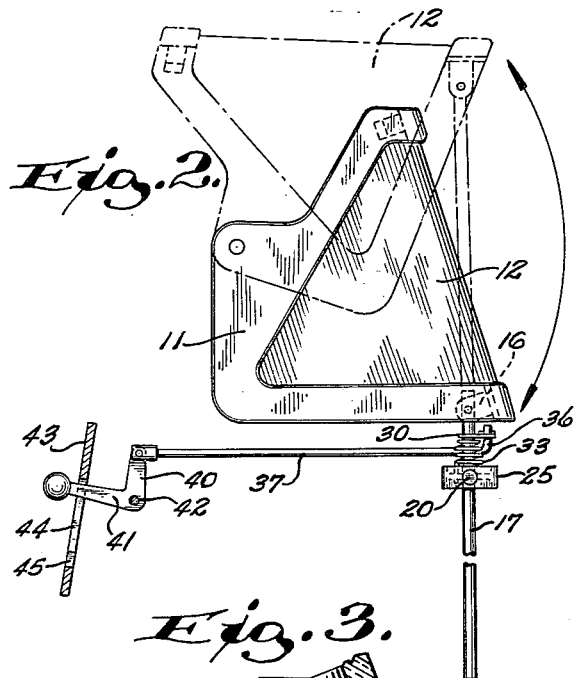
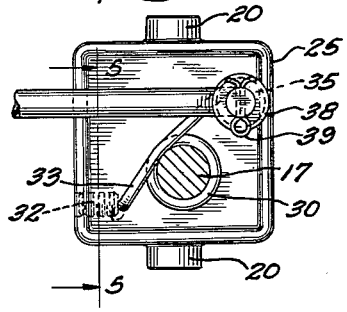
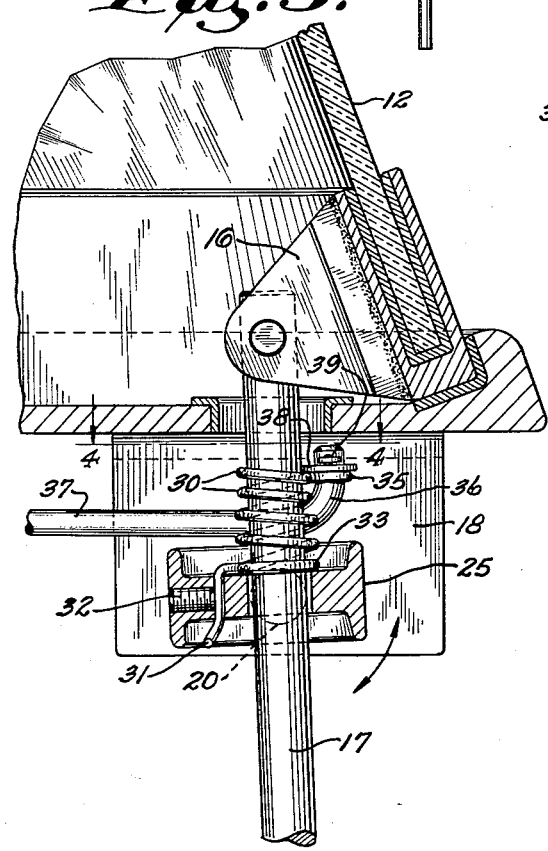
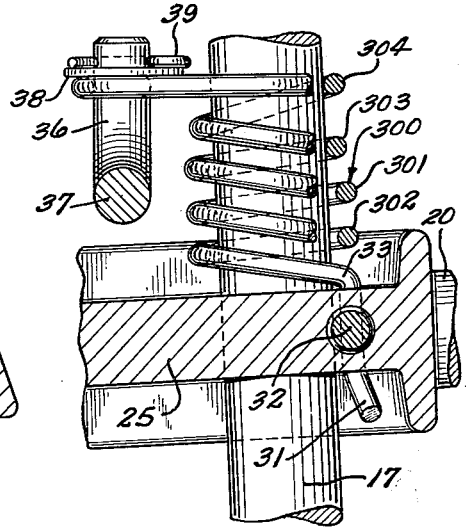
*INVENTORS.*
ALBERT E. BUCHHOLZ
RALPH R. HECK
BY
ATTORNEYS.

United States Patent Office 3,099,023
Patented July 30, 1963

3,099,023
WRAP SPRING ADJUSTMENT LOCK FOR
BOAT WINDSHIELD
Albert E. Buchholz, Kenosha, Wis., and Ralph R. Heck, Zion, Ill., assignors to Outboard Marine Corporation, Waukegan, Ill., a corporation of Delaware
Filed Dec. 19, 1960, Ser. No. 76,969
4 Claims. (Cl. 9—1)

This invention relates to a wrap spring adjustment lock.

It is desired to provide simple, inexpensive and easily operable means for locking a rod or the like in any one of an infinite number of positions within its range of movement. Under certain circumstances, it may be desired that the wrap spring which provides the lock shall also include one or more free coils providing a substantial degree of resilience whereby to minimize shock during the locking operation or thereafter. It may even accommodate some yielding from locked position if made sufficiently flexible.

While the invention is applicable to a variety of situations, it has been illustrated from the standpoint of locking in any desired pivotal adjustment the windshield of a vehicle such as a motorboat. In a motorboat, or in other vehicles, the windshield is subjected to a very considerable stress during rapid movement of the vehicle while the windshield is in a partially open position. In a vehicle, also, it is desirable that the lock shall not only be positive in its operation to fix the position of the windshield in any position and against any stress to which it may be subject but it is also desirable that the functioning of the lock in engagement and release shall be sure and smooth and easily operable. These requirements make the windshield exemplification an ideal one for the purpose of illustrating the characteristics of the invention.

Pivotally connected to the lower margin of the pivoted windshield frame is a rod which extends downwardly through a pivoted anchorage member in which the rod has a bearing. The anchorage member is capable of adapting itself to the various positions assumed by the rod as the windshield moves between full open and full closed positions.

Fixed to the anchorage member is one end of a wrap spring clutch which encircles the rod. At least the coils of the spring remote from the anchorage member are preferably contractilely engaged with the rod. Other coils may be free of the rod so that the device is not only a clutch but a spring.

A push and pull link is connected with the free end of the wrap spring to disengage it from the rod when the rod is to be unclutched to permit adjusting movement of the windshield. If the spring is contractile upon the rod, the spring is automatically engaged by its own contraction to lock the rod and the windshield whenever the link is released. It is convenient to provide a bell crank for manipulation of the link to engage or release the spring and the bell crank may be pivoted on an escutcheon plate on the instrument panel of the vehicle, which plate may have means for holding the bell crank in a position to which the spring is either clutched to, or released from, the rod.

In the drawings:

FIG. 1 is a view in perspective diagrammatically illustrating an exemplification of the invention, portions of the vehicle and the windshield mounting being fragmentarily shown.

FIG. 2 is a view in side elevation of a windshield and its lock and the control therefor, all portions of the vehicle being omitted.

FIG. 3 is a greatly enlarged detail view of the lock and the anchorage mounting thereof, the latter being shown in section, with the mounting pintle and associated parts being broken away.

FIG. 4 is a view taken in transverse section on the line 4—4 of FIG. 3.

FIG. 5 is a view in axial section showing a modified embodiment in the plane indicated at 5—5 in FIG. 4.

Fragmentarily illustrated at 6 are portions of a boat exemplifying a vehicle. The boat has a coaming at 7, an instrument panel at 8 and a deck portion 9 partially encircled by the windshield 10. The windshield 10 has a frame 11 and a pane 12. No deck house being illustrated, the windshield is shown to be pivoted at 13 to a pair of brackets 14 mounted on the coaming at opposite sides of the boat. A handle 15 is connected with the top of the windshield frame as a means of raising and lowering the windshield. Immediately beneath the handle there is provided a bracket 16 to which is pivoted a control rod 17 upon which the locking member hereinafter described is effective to secure the windshield in any position to which it is adjusted.

Mounted beneath the deck are the angle plates 18 and 19 which rotatably support trunnions 20 which pivot the anchorage member 25 through which the control rod 17 is reciprocable. The trunnions permit the anchorage member to adjust itself to the various positions which the rod assumes as the windshield moves between open and closed positions.

Encircling the rod is a wrap spring clutch 30 which has a fixed terminal 31 secured in an opening of the anchorage member 25 by means of set screw 32. The first coil 33 of the spring seats on the anchorage member. Being held by the set screw it cannot move either upwardly or downwardly.

The free end 35 of the spring 30 projects laterally and comprises an eye to receive the upturned end 36 of an operating link 37. A washer 38 encircles the link end 36 and rests upon the spring terminal 35 to support a cotter pin 39 passing through the end of the link. When there is no tension on the link 37, the inherent contractile bias of the spring 30 wraps its coils tightly around the rod 17 to hold the rod fixed to the anchorage member 25 against any movement upwardly or downwardly except such movement as may be accommodated by the resilience of the spring 30 itself. Between the first coil 33 and the free end 35 of the spring 30 are a series of axailly spaced and resilient coils, as shown best in FIGURES 3 and 5, which coils affords resilient axial movement of the rod relative to the spring anchorage 25, notwithstanding contractile grip of the rod by the spring adjacent to the free end 35.

The link 37 may be operated manually in any desired way. In practice, it is preferred that this be connected to a bell crank 40 provided with a handle 41. It is mounted on a pintle 42 at the rear of an escutcheon plate 43 which is provided with a slot 44 for the handle end of the bell crank. The slot may have an offset at 45 in which the handle end of the bell crank may be engaged to hold the bell crank in a position in which the link 37 is under tension to hold the spring 30 free of contractile engagement with rod 17, thereby freeing the rod for reciprocable movement.

Even if the spring 30 has its coils spaced, there will be little resilience if all of the coils are in contractile engagement with the rod. To increase the resilience of the spring in a direction axially of the control rod which it engages, I may design the spring as shown at 300 in FIG. 5. It will be observed that the coils 301 and 302 are of greater radius than the clutching coils 303 and 304 whereby they are free of contractile engagement with the rod 17 and are thereby enabled to yield freely either upwardly or downwardly to absorb any shock incident upon the locking of the upper portion of the spring including coils 303 and 304 with the rod while the rod and the member controlled thereby are still in motion. In certain situations other than windshield usage, the rod may be permitted limited movement from any locked position subject to the resilient opposition offered by such coils.

It will, of course, be understood that in certain situations two-handed operation is desired. In such cases, the link 37 will have no means of locking it in either position and it will therefore require manipulation by one hand of the operator while his other hand manipulates the windshield. Only if it is desired that the operator be able to manipulate the lock and the windshield consecutively will it be necessary to provide something comparable to the detent on escutcheon plate 43 for holding the lock in its disengaged position.

We claim:

1. The combination of a boat hull, a windshield pivotally mounted on said boat hull, a control rod connected to said windshield, an anchorage on said boat hull through which said rod is axially movable, a wrap spring encircling said rod, said wrap spring having one end connected with said anchorage and having a portion adjacent its other end in releasable contractile engagement with said rod, said spring having, between said one end and said other end portion, at least a pair of axially spaced and resilient coils with a relaxed radius of no less than that of said rod so as to be normally free of contractile engagement with said rod to permit limited resilient axial movement of said rod relative to said anchorage when said other end portion is contractively engaged with said rod, and means connected with said other end of said spring for effecting release of the contractile engagement of said other end portion of said spring with said rod.

2. The device of claim 1 in which
    said control rod is pivotally connected with said windshield, and
    said anchorage is provided with a transverse pivot to enable oscillatory movement thereof in accommodation of movement of said rod incident to tilting of said windshield.

3. The combination of
    a boat hull,
    a windshield tiltably mounted on said boat hull,
    a rod pivotally connected to said windshield to effect movement thereof incident to movement of said rod,
    means pivotally mounted on said boat hull for slideably retaining and guiding said rod during movement thereof to tilt said windshield,
    a wrap spring encircling said rod, having one end anchored to said guiding means, and having a portion of its other end in biased contractive engagement with said rod to prevent windshield-tilting movement thereof, said spring having axially spaced and resilient coils between said ends with a relaxed radius no less than that of said rod so as to permit limited axial movement of said rod relative to said retaining and guiding means when said other end portion is contractively engaged with said rod,
    means for effecting movement of said other end portion of said spring to release the contractive engagement of said spring with said rod, including a link connected to said other end of said spring and a lever pivotally mounted on said support means and pivotally connected to said link, and
    detent means on said support means including a shouldered plate positioned for engagement by said lever to fix said lever in position.

4. The combination of support means, a member shiftably mounted on said support means, a control rod connected to said shiftable member, an anchorage on said support means through which said rod is axially movable, a wrap spring encircling said rod, said wrap spring having one end connected with said anchorage and having a portion adjacent its other end in releasable contractile engagement with said rod, said spring having, between said one end and said other end portion, at least a pair of axially spaced and resilient coils with a relaxed radius of no less than that of said rod so as to be normally free of contractile engagement with said rod to permit limited resilient axial movement of said rod relative to said anchorage when said other end portion is contractively engaged with said rod, and means connected with said other end of said spring for effecting release of the contractile engagement of said other end portion of said spring with said rod.

References Cited in the file of this patent

UNITED STATES PATENTS

| 932,126 | Holbrook | Aug. 24, 1909 |
| 1,497,435 | Frink | June 10, 1924 |
| 1,659,111 | Lett | Feb. 14, 1928 |
| 2,112,709 | Reynolds | Mar. 29, 1938 |
| 2,750,994 | Howell | June 19, 1956 |
| 3,021,535 | Dorst | Feb. 20, 1962 |

FOREIGN PATENTS

| 536,088 | France | Feb. 6, 1922 |